US010050436B2

(12) United States Patent
Buchanan

(10) Patent No.: US 10,050,436 B2
(45) Date of Patent: Aug. 14, 2018

(54) PROTECTION DEVICE FOR AN ELECTRICAL POWER SYSTEM

(71) Applicant: Cooper Technologies Company, Houston, TX (US)

(72) Inventor: Marlowe James Buchanan, Lake Oswego, OR (US)

(73) Assignee: Eaton Intelligent Power Limited, Dublin (IE)

( * ) Notice: Subject to any disclaimer, the term of this patent is extended or adjusted under 35 U.S.C. 154(b) by 136 days.

(21) Appl. No.: 14/823,871

(22) Filed: Aug. 11, 2015

(65) Prior Publication Data
US 2017/0047733 A1 Feb. 16, 2017

(51) Int. Cl.
H02H 9/00 (2006.01)
H02H 9/04 (2006.01)
(52) U.S. Cl.
CPC ..................... H02H 9/04 (2013.01)
(58) Field of Classification Search
CPC .................. H02H 9/02; H02H 9/04
USPC ................................... 361/56, 91.1
See application file for complete search history.

(56) References Cited

U.S. PATENT DOCUMENTS

| 4,320,335 | A | * | 3/1982 | Staerzl | H02J 7/1492 |
| | | | | | 320/123 |
| 5,245,499 | A | * | 9/1993 | Senes | H01L 29/87 |
| | | | | | 257/E29.337 |
| 6,226,166 | B1 | * | 5/2001 | Gumley | H02H 9/06 |
| | | | | | 361/111 |
| 6,727,555 | B2 | | 4/2004 | Heinisch | |
| 7,561,394 | B2 | | 7/2009 | Mulligan | |
| 8,164,871 | B2 | * | 4/2012 | Galy | H01L 27/0262 |
| | | | | | 361/111 |
| 8,730,699 | B2 | * | 5/2014 | Grbovic | H02M 7/1623 |
| | | | | | 363/127 |
| 2006/0087778 | A1 | | 4/2006 | Hau | |
| 2012/0250205 | A1 | * | 10/2012 | Pfitzer | H02H 9/041 |
| | | | | | 361/91.1 |

OTHER PUBLICATIONS

EC2016 Load-Dump-Module 24 V DC, ifm electronic gmbh, Jan. 4, 2012, 1 page.

* cited by examiner

Primary Examiner — Thienvu Tran
Assistant Examiner — Lucy Thomas
(74) Attorney, Agent, or Firm — DiBerardino McGovern IP Group LLC

(57) ABSTRACT

A protection device for connection to a power bus of an electrical power system includes a bidirectional clamping apparatus configured to conduct current when a voltage across the bidirectional clamping apparatus is more positive than a positive voltage standoff and when the voltage across the bidirectional clamping apparatus is more negative than a negative voltage standoff; and a control element in series with the bidirectional clamping apparatus, the control element and the bidirectional clamping apparatus providing a current path across the power bus when a magnitude of a voltage on the power bus exceeds a positive voltage threshold or a negative voltage threshold, the positive voltage threshold being greater than the positive voltage standoff of the bidirectional clamping apparatus and the negative voltage threshold being more negative than the negative voltage standoff of the bidirectional clamping device.

28 Claims, 6 Drawing Sheets

PROTECTION DEVICE FOR AN ELECTRICAL POWER SYSTEM

TECHNICAL FIELD

This disclosure relates to a protection device for an electrical power system.

BACKGROUND

An electrical power system powers loads (such as electronic equipment) by delivering voltage to the loads through a power bus. The power system has an anticipated normal voltage operating range for its power bus. Loads powered by that bus are expected to operate correctly and without damage over that range. Disturbances to the power system, including but not limited to misconnections, broken electrical connections, and sudden switching ON or OFF of inductive load elements, can perturb the power bus with peak positive voltages that may greatly exceed the normal voltage operating range, or alternately may drive the voltage on the power bus negative.

SUMMARY

In one general aspect, a protection device for connection to a power bus of an electrical power system includes a bidirectional clamping apparatus configured to conduct current when a voltage across the bidirectional clamping apparatus is more positive than a positive voltage standoff and when the voltage across the bidirectional clamping apparatus is more negative than a negative voltage standoff; and a control element in series with the bidirectional clamping apparatus, the control element and the bidirectional clamping apparatus providing a current path across the power bus when a magnitude of a voltage on the power bus exceeds a positive voltage threshold or a negative voltage threshold, the positive voltage threshold being greater than the positive voltage standoff of the bidirectional clamping apparatus and the negative voltage threshold being more negative than the negative voltage standoff of the bidirectional clamping device.

Implementations may include one or more of the following features.

The bidirectional clamping apparatus may include a metal oxide varistor (MOV).

The bidirectional clamping apparatus may include a plurality of MOVs connected in parallel, series, or series-parallel with each other.

The bidirectional clamping apparatus may include a bidirectional transient-voltage-suppression (TVS) diode.

The bidirectional clamping apparatus may include a plurality of bidirectional TVS diodes connected in parallel, series, or series-parallel with each other.

The bidirectional clamping apparatus may include one or more MOVs and one or more bidirectional TVS diodes.

The bidirectional clamping apparatus may include two or more unidirectional diodes configured as a bidirectional diode, each unidirectional diode having a forward voltage at which the diode conducts current in a first direction and a reverse breakdown voltage at which the diode conducts current in a different direction. The positive voltage standoff of the bidirectional clamping apparatus may be the reverse breakdown voltage of one of the unidirectional diodes and the negative voltage standoff of the bidirectional clamping apparatus is the reverse breakdown voltage of another one of the unidirectional diodes. The reverse breakdown voltage of at least one of the two or more unidirectional diodes may be different than the reverse breakdown voltage of at least one of the other unidirectional diodes.

The control element may include a first control element and a second control element, the first control element and the bidirectional clamping apparatus providing the current path across the power bus when the voltage across the power bus is more negative than the negative voltage threshold of the protection device, and the second control element and the bidirectional clamping apparatus providing the current path across the power bus when the voltage across the power bus is more positive than the positive voltage threshold of the protection device.

The second control element may include a switch that has only two states, an ON state and an OFF state, and, in these implementations, current flows through the second control element only when the switch is in the ON state. The switch of the second control element may be a current-controlled switch, and the protection device also may include an electrical network configured to generate a trigger current sufficient to trigger the current-controlled switch to the ON state. An electrical component may be between the electrical network and the power bus, the electrical component providing an electrical current when the voltage across the power bus exceeds the positive voltage threshold of the protection device, and the electrical network generating the trigger current based on the electrical current provided by the electrical component. The electrical component may include a bidirectional TVS diode. The first control element may include a unidirectional TVS diode, and the current-controlled switch of the second control element may include a thyristor.

The protection device also may include a bidirectional TVS diode in series with at least one diode, where the first control element includes a unidirectional TVS diode, the second control element includes a current-controlled switch, and the bidirectional TVS diode is between a gate of the current-controlled switch and the power bus. The current-controlled switch may be associated with an activation delay, and, in these implementations, the current-controlled switch and the bidirectional clamping apparatus may provide the current path across the power bus only after the activation delay, and during the activation delay, either or both of: (a) the bidirectional TVS diode connected between the gate of the current-controlled switch and the power bus and (b) the unidirectional TVS diode and the bidirectional clamping apparatus provide the current path across the power bus.

The protection device also may include an electronic component that is separate from the bidirectional clamping apparatus, the electronic component providing a second current path across the power bus at least some of the time when the voltage on the power bus exceeds the positive voltage threshold.

The magnitude of the positive voltage standoff of the bidirectional clamping apparatus and the magnitude of the negative voltage standoff of the bidirectional clamping apparatus may be substantially the same.

The protection device may be configured to withstand without damage the application of continuous voltages between a maximum negative voltage and a maximum positive voltage, the negative voltage standoff of the bidirectional clamping apparatus is equal to or more negative than the maximum negative voltage, and the positive voltage standoff of the protection device is equal to or more positive than the maximum positive voltage.

In another general aspect, a bidirectional clamping apparatus and a control element are provided across a power bus; current from the power bus is conducted through the bidirectional clamping apparatus and the control element to clamp the voltage on the power bus when the voltage on the power bus is more positive than a positive voltage threshold, the positive voltage threshold being greater than a positive voltage standoff of the bidirectional clamping apparatus; and current is conducted from the power bus through the bidirectional clamping apparatus and the control element to clamp the voltage on the power bus when the voltage on the power bus is more negative than a negative voltage threshold, the negative voltage threshold being more negative than a negative voltage standoff of the bidirectional clamping apparatus.

Implementations may include one or more of the following features. Current may be conducted from the power bus through a current path formed with an electronic component that is separate from the bidirectional clamping apparatus, to clamp the voltage on the power bus at least some of the time when the voltage on the power bus is greater than a positive voltage threshold. Current may be conducted with the electronic component that is separate from the bidirectional clamping apparatus prior to conducting the current from the power bus with the bidirectional clamping apparatus and the control element.

In another general aspect, a protection device for a power system includes a bidirectional clamping apparatus including: at least one MOV, at least one bidirectional TVS diode, or at least one MOV and at least one bidirectional TVS diode; and a control element in series with the bidirectional clamping apparatus, the control element including: a first electronic component, and a second electronic component, where each of the first and second electronic components includes an anode and a cathode, and the bidirectional clamping apparatus is connected to the cathode of the first electronic component and to the anode of the second electronic component.

Implementations may include one or more of the following features. The first electronic component of the control element may include a diode, and the second electronic component of the control element may include a current-controlled switch. The first electronic component of the control element may include a unidirectional TVS diode, and the second electronic component of the control element may include a thyristor. The current-controlled switch may include a gate, and the protection device also may include an electrical network connected to the gate of the current-controlled switch. The protection device also may include a bidirectional TVS diode connected to the electrical network.

Implementations of any of the techniques described above may include an apparatus, a system, a protection device for a power system, and/or a method. The details of one or more implementations are set forth in the accompanying drawings and the description below. Other features will be apparent from the description and drawings, and from the claims.

DRAWING DESCRIPTION

DETAILED DESCRIPTION

Figure 1A:
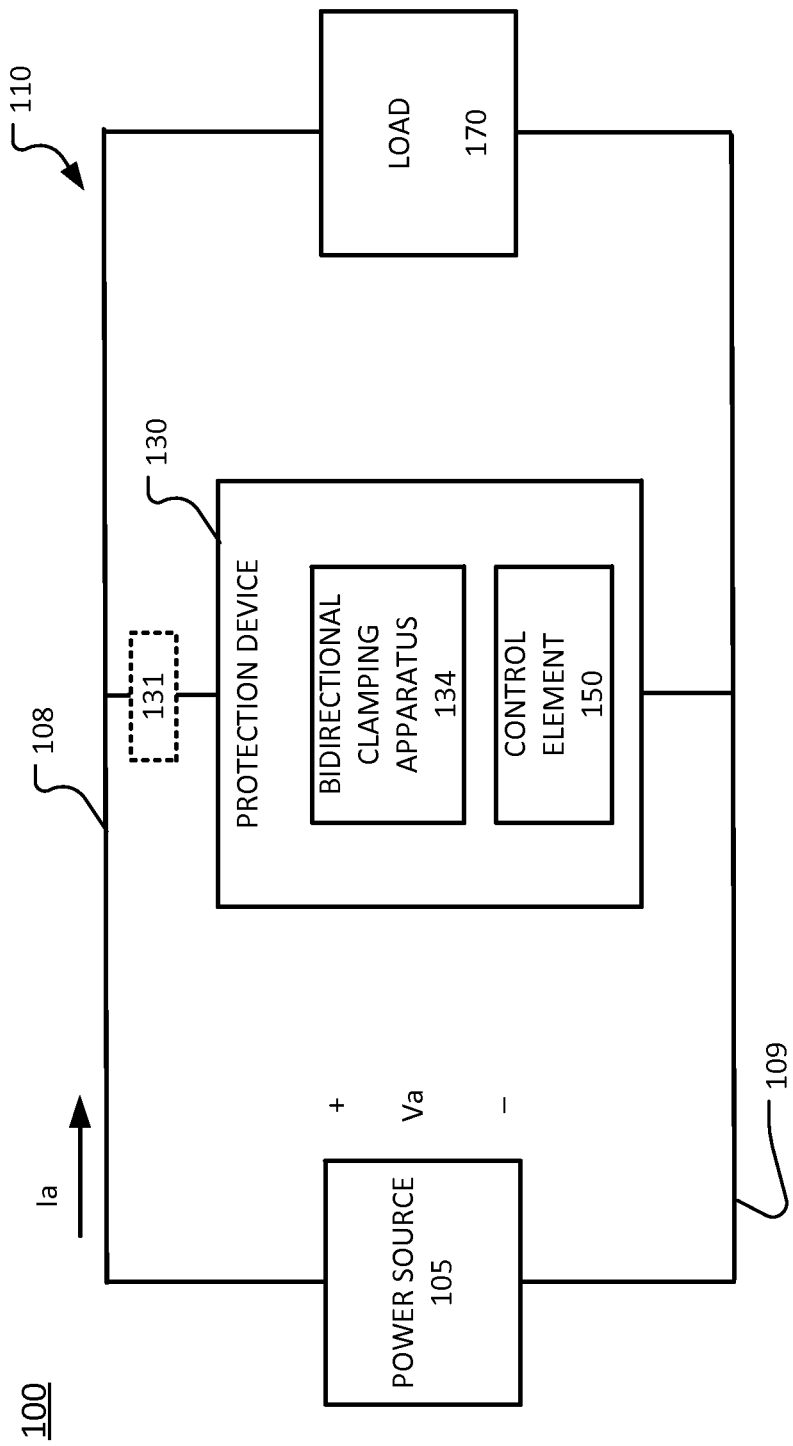
FIG. 1A is a block diagram of an exemplary electrical power system and a protection device.

Referring to FIG. 1A, a block diagram of an exemplary electrical power system 100 is shown. The power system 100 has an anticipated normal voltage operating range. The electrical power system 100 is a direct-current (DC) electrical power system.

The power system 100 includes a protection device 130 that protects a load 170, which is connected to and receives electrical power from a power bus 110 of the system 100, from positive and negative voltage transients that are outside of the normal voltage operating range. Although the load 170 is represented by a single element, the load 170 may include many different kinds of loads, all of which receive electrical power from the bus 110. The load 170 may include, for example, electronic equipment.

The power bus 110 receives power from a power source 105 that, when operating properly, provides a nominal voltage in the normal voltage operating range to the bus 110. The bus 110 includes a nominally high line 108 and a nominally low line 109. The voltage across the bus 110 is the voltage difference between the voltage of the nominally high line 108 and the voltage of the nominally low line 109. Under typical operating conditions, the voltage across the bus 110 is positive (greater than zero volts), with the high line 108 being at a more positive voltage than the nominally low line 109. When the voltage on the nominally low line 109 becomes more positive than the nominally high line 108, the voltage across the bus 110 is negative (below zero volts).

The presence of a voltage transient on the bus 110 may drive the voltage across the bus 110 outside of the normal voltage operating range. A voltage transient is a sudden and short-lived increase or decrease in voltage and has a peak voltage that lasts for a short amount of time, for example, hundreds (100 s) of milliseconds (ms) or less. For the load 170 to be used reliably on the power bus 110, the loads should tolerate or at least withstand without damage the peak bus voltage transients, both positive and negative, that the load 170 will encounter. As different electrical power systems with the same nominal power bus voltage can have dramatically different transients imposed upon them, it is impractical in many instances to design the loads, particularly electronic components, that make up the load 170 to be individually protected so as to withstand without damage the worst conceivable transients of any system style using that nominal power bus voltage.

The protection device 130 provides a practical and efficient approach for protecting the load 170. The protection device 130 limits the maximum positive and negative voltage excursions on the power bus 110 at the system or power bus level. Loads can then be selected for the system 100 such that the guaranteed withstand (no damage) voltage range of the loads is greater than the peak voltage range that the protection device 130 enforces on the power bus 110.

The protection device 130 connects across the power bus 110 (between the nominally high line 108 and the nominally low line 109) and is thus in parallel with the connected system loads (represented in FIG. 1A as the load 170). The peak positive and negative voltages seen by the load 170 are thus also applied across the protection device 130.

The protection device 130 forms a current path across the bus 110 when the voltage across the bus 110 becomes more positive or more negative than certain levels (a positive voltage threshold Vp of the protection device 130 and a negative voltage threshold Vn of the protection device 130, respectively). When the current path is formed, the bidirectional clamping apparatus 134 draws current (for example, tens or hundreds of amperes) to clamp positive voltage excursions of the voltage on the power bus 110 at or below (less positive than) a positive clamping voltage Vcp and to clamp negative voltage excursions of the voltage on the power bus 110 at or below (less negative than) a negative clamping voltage Vcn. The positive clamping voltage Vcp and the negative clamping voltage Vcn are within the withstand/no-damage ratings of loads that are targeted for protection. Thus, the protection device 130 maintains the voltage on the power bus 110 to within the withstand/no-damage ratings of the loads selected for protection.

The protection device 130 clamps any voltage transient that causes the voltage across the bus 110 to become more positive than the positive voltage threshold Vp or more negative than the negative voltage threshold Vn. Thus, the protection device 130 clamps high-energy voltage transients that have low source impedance and peak voltages that are tens or hundreds of volts larger in magnitude than the positive and negative voltage thresholds Vp and Vn, and the protection device 130 also clamps lower energy voltage transients that have significant source impedance and peak voltages that are just a few volts to hundreds of volts larger in magnitude than the positive and negative voltage thresholds Vp and Vn. In other words, the bidirectional clamping apparatus 134 is capable of conducting currents of a range of amounts, from tens of milliamperes to hundreds of amperes, and conducts only the current that is needed to clamp a particular voltage transient. In this way, the protection device 130 clamps positive and negative voltage excursions on the power bus 110 such that the magnitude of the voltage across the bus 110 is maintained at or below the positive clamping voltage Vcp and the negative clamping voltage Vcn.

A particularly challenging electrical power system to protect is that commonly found in trucks and automobiles, construction/agriculture (con/ag) equipment, and industrial equipment. In these electrical power systems, the power source 105 includes an engine that turns an alternator, which then charges one or more batteries while also powering the power bus 110. Many systems of this type operate with nominal 12 volts (V) or 24V on their power bus. Additionally, many of these systems are designed to be easily accessible to a human, opening the door for improper uses and configurations that may cause abnormal high-voltage conditions in the system that can continue for many seconds or minutes. These voltages are referred to as "continuous abnormally high voltages." Because some of these improper uses and configurations can be anticipated, the loads that are connected to the power bus 110 in these applications are generally designed to withstand certain continuous abnormally high voltages without damage. Thus, the protection device 130 is also configured to withstand these continuous abnormally high voltages while also being capable of clamping much higher transient voltages (voltages that are short-lived and last for hundreds of milliseconds or less) to a level that may be within a few volts of the continuous abnormally high voltages.

One example of a continuous abnormally high voltage that may be caused by operator error is a reverse connection of the battery, which occurs when the operator connects the negative terminal of the battery to the nominally high line 108 and the positive terminal of the battery to the nominally negative line 109. In a system that nominally has 12V on the power bus, a reverse connection of the battery places a negative 12V across the bus 110 (and the load 170) and in a 24V system places a negative 24V across the bus 110 (and the load 170) for potentially many seconds to several minutes while the person making the connections tries to determine why things are not working properly. Because this is a foreseeable mistake, equipment intended as loads in more expensive or critical systems is generally rated to withstand without damage a reverse battery connection for some prolonged time.

Another example of a continuous abnormally high voltage in such a system can occur during an attempt to jump-start a truck/car/machine that has a dead battery using a double battery. A double battery is a battery that has twice the nominal voltage of the dead battery and may be formed from, for example, two external batteries similar to the dead battery connected in series, or some other power source with a voltage that is greater than the nominal voltage of the dead battery. This configuration results in twice the nominal voltage being applied across the bus 110 for many seconds to many minutes. Once again, the equipment planned as loads in more expensive or critical systems of this type is typically rated to withstand without damage a double battery connection for some prolonged period of time.

Because the loads are rated to withstand the double battery connection and the reverse battery connection, the protection device 130 is also designed to withstand these conditions and is configured to not draw significant current during a reverse battery condition or a double battery connection.

Operator error also may cause positive voltage transients that have peak voltages greater than that of the double jump-start. One example of such a voltage transient is a "load dump," which occurs when the battery becomes disconnected from the bus 110 while the alternator is providing significant current to the battery. In systems that are designed to allow a non-specialist to replace the battery, the battery may be connected to the bus 110 with a collar that tightens over a battery post. If this connection is not checked periodically and/or is not tightened correctly, the connection may become loose and disconnect while the alternator is providing current to the battery. Current from the alternator that would otherwise flow to the battery is instead pushed into the power bus 110 and may drive the voltage across the power bus 110 to, for example, 100V in a nominally 12V system and 200V in a nominally 24V system for a few 100 milliseconds (ms). Voltage peaks of this magnitude can damage many loads unless clamped to some lower level.

Voltage transients occur on the power bus 110 even in the absence of operator error. For example, a transient positive or negative voltage pulse called an "Inductive Switch Kick" may arise from switching ON and OFF of inductive loads. Switching an inductive load can generate, for example, a voltage transient with a pulse width on the order of 1 millisecond (ms) and a peak amplitude of positive or negative 600V in an electrical power system that is nominally 24V. Additionally, the power system may include conductors that are in close physical proximity. A sudden increase or decrease in current in one conductor can induce voltage and thus current in an adjoining wire, giving rise to a "Mutual Inductance" transient. This type of transient can have a peak amplitude of positive or negative 300V in a 24V system, with a pulse width of, for example, 15 microseconds (μs).

A difficulty in the more challenging systems discussed above can arise from the desire to clamp transients at a level Vcp that is only perhaps a few volts higher than the Vsp threshold of generally available clamping elements, which are typically metal oxide varistors (MOVs), transient voltage suppression diodes (TVS diodes), or Zener diodes. The nature of these components is that there is a wide gap between the Vsp threshold level at which the element just begins to draw a minor amount of current, for example, 1-10 mA, and the level Vcp at which it is conducting a rated very large clamping current, often tens to hundreds of amperes. For example, MOVs can have a Vcp that is about two (2) times greater than its Vsp, and TVS or Zener diodes in their breakdown conduction mode generally have a Vcp that is about 1.4 times larger than their Vsp. Should a desired system application need to comply with a smaller range, for example, Vcp/Vsp less than 1.25, there are no candidates for clamping elements with that narrow a range, and the protection device 130 can be used to provide a more complex active clamping scheme.

The protection device 130 can be configured to (1) clamp both fast and slow high-energy negative transients at or below the negative clamping voltage Vcn, which is within the no-damage range of the loads to be powered, while not being damaged should an anticipated continuous lessor reverse (negative) voltage be applied to the power bus 110 and (2) clamp both fast and slow (high and very high energy) positive transients at or below a positive clamping voltage Vcp, which is within the no-damage rating of the loads to be powered, while not being damaged should an anticipated continuous lessor positive voltage be applied.

Additionally, there can be a great deal of energy in some positive voltage transients such as a load dump. The large amount of energy can make it difficult to clamp the transient to a lower voltage, and more so if the protection device is used in a power system that also has to, as an example, tolerate voltages just below the voltage at which the transient is to be clamped. For example, in a nominal 24V system, the system may be required to withstand 52V without damage (to provide some margin on top of a 48V abnormally high continuous positive voltage, such as a double battery jump-start), while drawing essentially no current, and yet draw large amounts of current to clamp the highest energy transients to perhaps under 60V. The configuration of the protection device 130 allows this while also standing off (withstanding without damage) some required reverse voltage (a voltage at which the voltage across the bus 110 is negative) and having the ability to clamp negative voltage transients at or below the clamping voltage Vcn.

As shown in FIG. 1A, the protection device 130 includes a bidirectional clamping apparatus 134 in series with a control element 150. The control element 150 and the bidirectional clamping apparatus 134 form a current path across the bus 110 when the voltage across the bus 110 becomes more positive than the positive voltage threshold Vp or more negative than the negative voltage threshold Vn. When the current path is formed, the bidirectional clamping apparatus 134 conducts current and clamps the voltage on the bus 110 at a voltage that is no higher than the positive clamping voltage Vcp or no more negative than the negative clamping voltage Vcn.

Figure 1B:
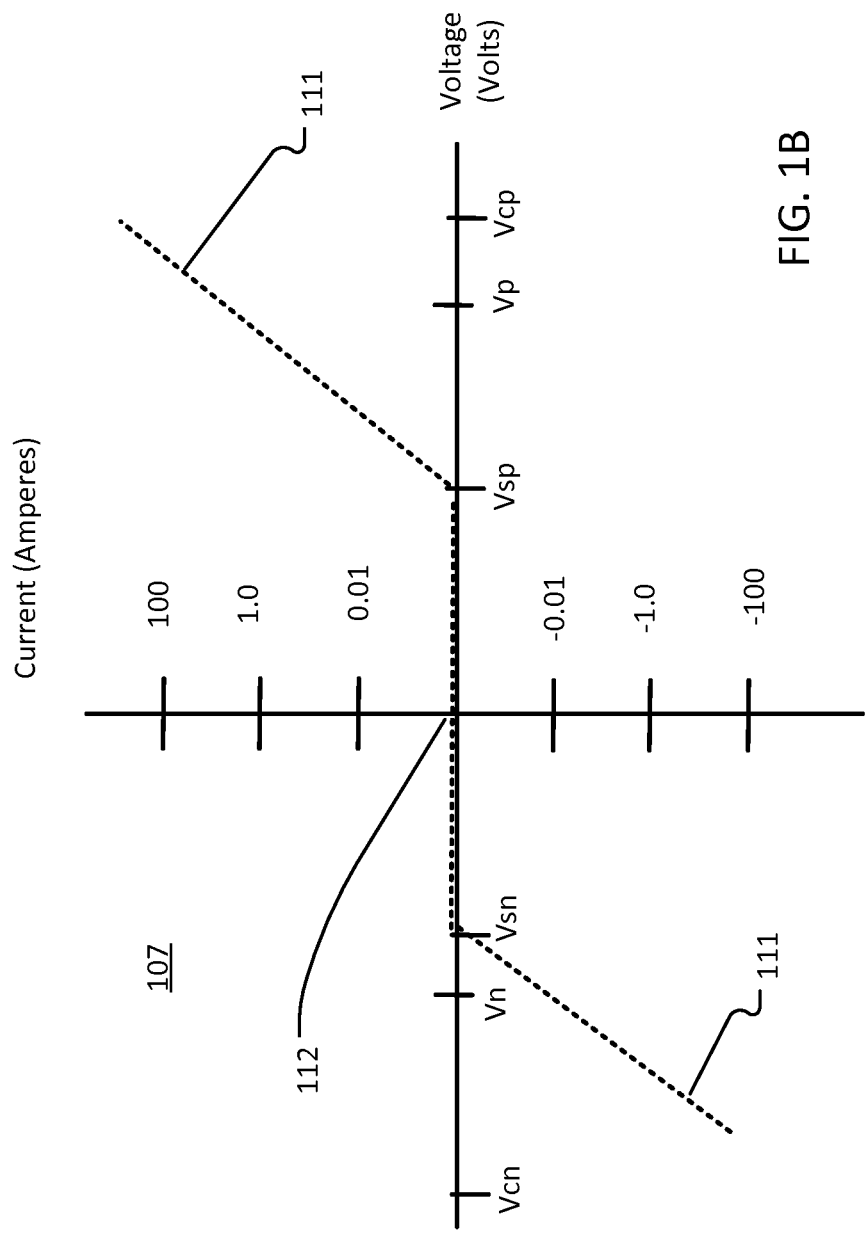
FIG. 1B is an exemplary current-voltage curve for a bidirectional clamping device of the protection device of FIG. 1A.

Referring also to FIG. 1B, a plot 107 of an exemplary relationship 111 (shown with a dashed line) between current in amperes (vertical logarithmic axis) and voltage in volts (horizontal axis) for the bidirectional clamping apparatus 134 is shown. The relationship 111 is an exemplary current-voltage (I-V) characteristic (or transfer characteristic) for the bidirectional clamping apparatus 134. As shown in FIG. 1B, the positive voltage threshold Vp of the protection device 130 is greater than the positive voltage standoff Vsp of the bidirectional clamping apparatus 134, and the negative voltage threshold Vn of the protection device 130 is more negative than the negative voltage standoff Vsn of the bidirectional clamping device 134.

The bidirectional clamping apparatus 134 is an electronic component, or a collection of electronic components, that conducts current at voltages above its positive voltage standoff Vsp and at voltages that are more negative than its negative voltage standoff Vsn. The positive voltage standoff Vsp and the negative voltage standoff Vsn are the voltages at which the apparatus 134 begins to conduct a minor amount of current, for example, 1-10 milliamps (mA). The apparatus 134 otherwise does not allow current to flow or conducts only a negligible amount of current (for example, less than 1 mA).

In some implementations, the transfer characteristic 111 of the bidirectional clamping apparatus 134 is symmetric about a zero voltage and zero current origin 112 with the magnitude of the positive voltage standoff Vsp and the negative voltage standoff Vsn being substantially the same to within a range of expected manufacturing tolerances. For example, the bidirectional clamping apparatus 134 may include a single device or a collection of devices that are symmetrically bidirectional by nature, such as a metal oxide varistor (MOV), or a device that is generally designed to be a symmetrical bidirectional device, such as a bidirectional transient voltage suppression (TVS) diode. The bidirectional clamping apparatus 134 may include any series, parallel, or series-parallel combination of such devices and a combination of different types of devices. For example, the bidirectional clamping apparatus 134 may include one or more MOVs and one or more bidirectional TVS diodes arranged in any manner.

The bidirectional clamping apparatus 134 is bidirectional in that the apparatus 134 can conduct current in two different directions, a first direction at voltages that are above Vsp and a second direction at voltages that are more negative than Vsn. The magnitudes of Vsp and Vsn are relatively large, for example, in the tens to hundreds of volts. In the bidirectional clamping apparatus 134, the current flow in both directions arises from the same mechanism. This is in contrast to a unidirectional device, some of which may be capable of conducting current in two different directions, but do so through different mechanisms. For example, a single Zener diode and a single unidirectional TVS diode are unidirectional devices that can conduct current from the anode to the cathode when a voltage equal to or greater than a forward voltage is across the diode and in the opposite direction (from the cathode to the anode) when the voltage across the device is equal to or greater than a reverse breakdown voltage. However, the mechanism that causes current to flow from the anode to the cathode when a voltage equal to or greater than the forward voltage is applied to the Zener diode is different from the breakdown mechanism that causes current to flow from the cathode to the anode when a voltage equal to or greater than the reverse breakdown voltage is applied to the Zener diode.

Furthermore, the voltages (Vsp and Vsn) at which the bidirectional clamping apparatus 134 begins to conduct more than a negligible amount of current are both relatively large (for example, tens of volts or greater). This is in contrast to a typical unidirectional device (such as a Zener diode or a unidirectional TVS diode), which conducts a large current in a forward direction from the anode to the cathode at a relatively low forward voltage (for example, 1-2 volts).

Although the bidirectional clamping apparatus 134 is different from a unidirectional device, two or more electronic components that are typically considered unidirectional may be connected to each other to behave as a bidirectional device and can be used in such a configuration to form all or part of the bidirectional clamping apparatus 134. For example, two identical Zener diodes with the anodes connected to each other or with the cathodes connected to each other form a symmetrical bidirectional device. A pair of Zener diodes (or a pair of unidirectional TVS diodes) connected in this manner may be used in the bidirectional clamping apparatus 134 alone or with other bidirectional devices. For example, a pair of Zener diodes connected in this way also can be connected in parallel with other similar sets of Zener diode pairs and/or TVS diodes, MOVs or any other bidirectional device to form the bidirectional clamping apparatus.

In some implementations, the transfer characteristic 111 of the bidirectional clamping apparatus 134 or a component of the apparatus 134 may be asymmetric, but the apparatus 134 is still a bidirectional device. In this example, the bidirectional clamping apparatus 134 may include two or more non-identical unidirectional electrical components (such as, for example, two unidirectional TVS diodes, two Zener diodes, or a Zener diode and a unidirectional TVS diode) connected anode-to-anode or cathode-to-cathode and oriented such that one of the unidirectional electrical components is reverse biased and acts in the avalanche mode with current flowing from the cathode to the anode during a positive voltage transient and the other unidirectional electrical component is reverse biased and acts in the avalanche mode with current flowing from the cathode to the anode during a negative voltage transient.

In these implementations, the positive voltage standoff (Vsp) and the negative voltage standoff (Vsn) of the bidirectional clamping apparatus 134 is based on the reverse breakdown voltage and the forward voltages of the unidirectional diode pair or pairs. Because the individual unidirectional diodes may have different forward voltage and reverse breakdown voltages, the magnitude of the positive voltage standoff (Vsp) and the negative voltage standoff (Vsn) may be different and the transfer characteristic 111 of the bidirectional clamping apparatus 134 is not symmetric about the current, voltage origin 112.

The bidirectional clamping apparatus 134 is used with the control element 150. The configuration of the control element 150 together with the properties of the bidirectional clamping apparatus 134 determines the positive voltage threshold Vp and the negative voltage threshold Vn that cause protection device 130 to form the current path across the bus 110.

Using the control element 150 with the bidirectional clamping apparatus 134 overcomes challenges that may arise when using a bidirectional device alone. Alone, the bidirectional clamping apparatus 134 can be damaged by the continuous abnormally high voltages that exceed its Vsp, even though the apparatus 134 is not damaged by shorter duration but much higher magnitude voltage transients. The control element 150 protects the bidirectional clamping apparatus 134 by preventing significant current from flowing in the apparatus 134 during application of the continuous abnormally high voltages.

Exemplary implementations of the protection device 130 are discussed below.

Figure 2:
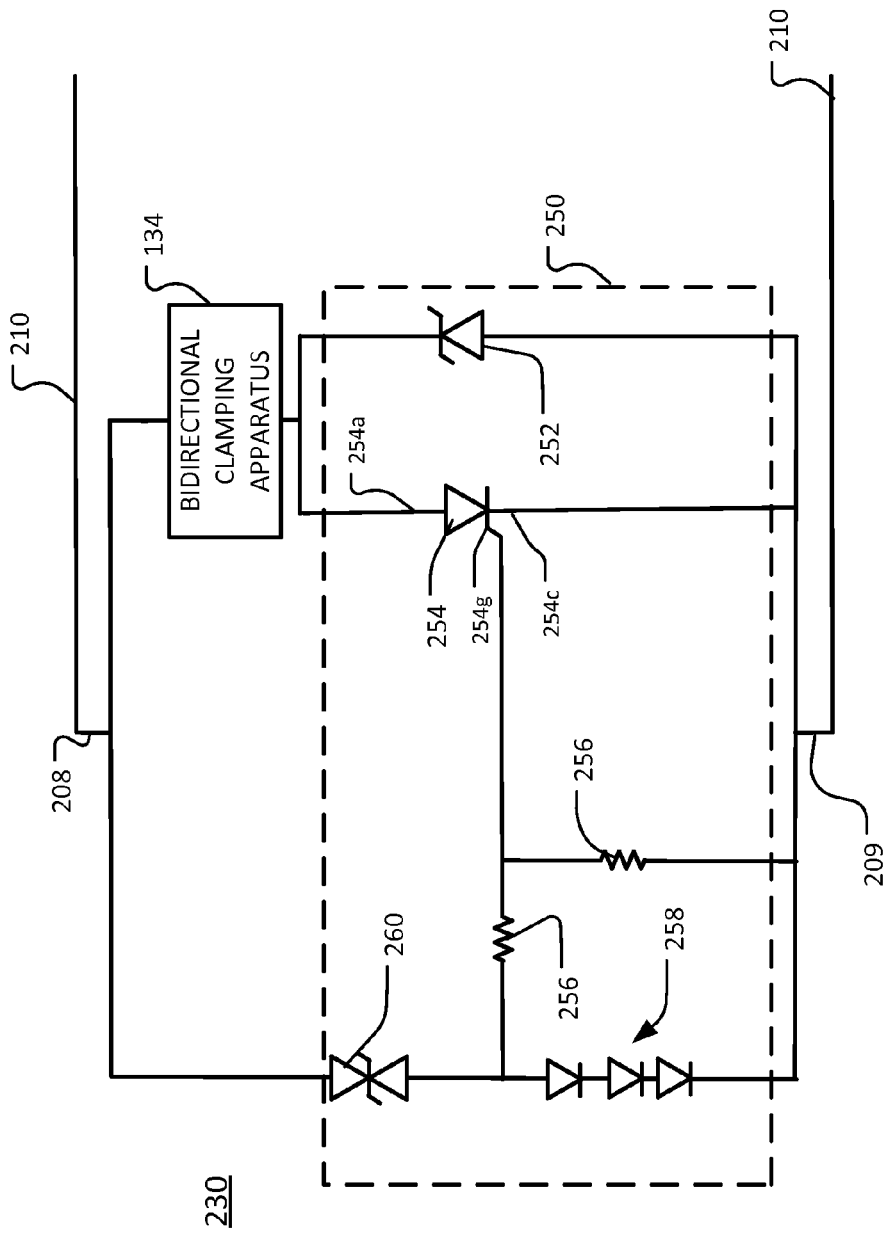
FIGS. 2-5 are block diagrams of exemplary protection devices.

Referring to FIG. 2, a block diagram of an exemplary protection device 230 is shown. In the example shown in FIG. 2, the protection device 230 is connected to a DC electrical power bus 210 that receives power from a power source (not shown) that also supplies electrical power to one or more loads (such as the load 170 of FIG. 1A). The protection device 230 is in parallel with the loads, thus the voltage across the protection device 230 is also the voltage across the load. The power bus 210 includes a nominally high line 208 and a nominally low line 209. Under ordinary operating conditions, the nominally high line 208 is at a more positive voltage than the nominally low line 209.

The protection device 230 includes the bidirectional clamping apparatus 134 and a control element 250. When the voltage across the bus 210 is more negative than a negative voltage threshold Vn or more positive than a positive threshold Vp, the protection device 230 provides a current path across the bus 210, from the high line 208 to the low line 209, clamping the voltage on the bus 210 at or below a negative clamping voltage Vcn or a positive clamping voltage Vcp. The positive and negative clamping voltages Vcp and Vcn are within the no-damage rating of the loads connected to the bus 210.

The control element 250 includes an electronic component 252, a switch 254 that is in parallel with the electronic component 252, resistors 256, diodes 258, and an electronic component 260. In the example of FIG. 2, the electronic component 252 is a unidirectional transient-voltage-suppression (TVS) diode. The switch 254 is a bistable switch (a switch that has only two stable states, an ON state and an OFF state), and is current-controlled. The switch 254 is a three-terminal device in the example of FIG. 2. The switch 254 may be, for example, a thyristor, such as a silicon-controlled rectifier (SCR). The electronic component 260 is a bidirectional TVS diode.

The unidirectional TVS diode 252 is in series with the bidirectional clamping apparatus 134, with the cathode of the unidirectional TVS diode 252 connected to the bidirectional clamping apparatus 134. The unidirectional TVS diode 252 has a forward voltage and a reverse breakdown voltage. The unidirectional TVS diode 252 conducts current from the anode to the cathode at the forward voltage and in the reverse direction (from the cathode to the anode) at the reverse breakdown voltage. Thus, significant current will not flow through the unidirectional TVS diode 252 and the bidirectional clamping apparatus 134 unless the voltage across the bus 210 is sufficient to cause both the unidirectional TVS diode 252 and the bidirectional clamping apparatus 134 to conduct current. The combination of these two elements will not conduct significant amounts of current unless the voltage across the bus 210 becomes more positive than the sum of the reverse breakdown voltage of the unidirectional TVS diode 252 and the positive voltage standoff Vsp of the apparatus 134, or more negative than the sum of the forward voltage of the unidirectional TVS diode 252 and the negative voltage standoff Vsn of the apparatus 134.

Thus, the protection device 230 can be configured to withstand without damage and not draw significant current when continuous abnormally high positive and negative voltages are on the bus 210. For example, the reverse breakdown voltage of the unidirectional TVS diode 252 and the positive voltage standoff Vsp of the bidirectional clamping apparatus 134 can be set or selected so that the protection device 230 draws no more than a few milliamps (mA) during a continuous abnormally high positive voltage on the bus 210, such as a double battery jump start. The bidirectional clamping apparatus 134 is also configured such that the negative voltage standoff Vsn of the apparatus 134 is equal to or exceeds the maximum continuous negative voltage that is anticipated to be applied to the protection device 230. In this way, the bidirectional clamping apparatus 134 also withstands without damage and draws only a few mA during a continuous abnormally high negative voltage on the bus 210, such as a reverse battery condition.

Although the protection device 230 does not draw significant current during continuous abnormally high positive or negative voltage events, the protection device 230 may conduct large amounts of current when the voltage across the bus becomes more positive or more negative than the voltage thresholds of the protection device 230 (Vp and Vn). In this way, the protection device 230 withstands continuous abnormally high voltages and is also able to clamp transient voltages that have greater voltages.

When the voltage across the bus 210 is more negative than the negative voltage threshold Vn, the protection device 230 conducts current across the bus 210 and clamps at or below (less negative) the negative clamping voltage Vcn, which is within the no-damage rating of the loads selected for protection on the bus 210. In the example of FIG. 2, the protection device 230 conducts significant amounts of current when the voltage across the bus 210 is more negative than the sum of the forward voltage of the unidirectional TVS diode 252 and the negative voltage standoff Vsn of the apparatus 134. Thus, the negative voltage threshold Vn of the protection device 230 is the sum of the forward bias voltage of the unidirectional TVS diode 252 and the negative voltage standoff Vsn of the bidirectional clamping apparatus 134.

The protection device 230 also clamps positive transient voltages that cause the voltage across the bus 210 to exceed the positive voltage threshold Vp. The protection device 230 clamps these positive transient voltages at or below (less positive) the positive clamping voltage Vcp. The positive voltage threshold Vp is greater than the maximum continuous positive voltage that the protection device 230 withstands without damage. The bidirectional TVS diode 260 has a positive voltage standoff Vsp 260 and a negative voltage standoff Vsn 260. When the voltage across the bus 210 is at or more positive than Vsp 260 plus the forward drop of diode(s) 258, the bidirectional TVS diode 260 begins to conduct significant current. The forward biased diodes 258 and the bidirectional TVS diode 260 clamp very fast positive transients (for example, transients with nanosecond rise-times).

Additionally, if the peak voltage of the positive transient is greater than or equal to the sum of the reverse breakdown voltage of the unidirectional TVS diode 252 and the positive voltage standoff Vsp of the apparatus 134, these very fast positive transients may be clamped as well by the bidirectional clamping apparatus 134 and the unidirectional TVS diode 252. Thus, the protection device 230 can be configured to have two separate conduction paths for very fast positive transients, with one of the conduction paths going through one or more electronic components (the bidirectional TVS diode 260 and the diodes 258 in this example) that are separate from and independent of the bidirectional clamping apparatus 134.

For a positive transient voltage that lasts a sufficient amount of time (for example, more than a microsecond), some of the current that passes through the bidirectional TVS diode 260 flows to the resistor divider 256 and forms a trigger current, which flows to gate 254 g of the thyristor 254. The trigger current, when greater than a threshold current that is particular to the thyristor 254, turns the thyristor 254 to the forward conducting state (ON). When the thyristor 254 is ON, a current path is formed between an anode 254a and a cathode 254c of the thyristor 254, connecting the bidirectional clamping apparatus 134 to the lines 208 and 209 and forming a current path across the bus 210.

The bidirectional clamping apparatus 134 then conducts the amount of current necessary to clamp the positive voltage transient at or below the positive clamping voltage Vcp. After the positive voltage transient has dissipated, the current through the bidirectional clamping apparatus 134 drops to zero, causing the current through the thyristor 254 to drop. The thyristor 254 switches to the OFF state such that the bidirectional clamping apparatus 134 no longer provides a current path across the bus 210.

In sum, the protection device 230 clamps all negative voltage transients of greater magnitude than Vn by providing a current path across the bus 210 through the bidirectional clamping apparatus 134 and the forward biased unidirectional TVS diode 252. Very fast positive transients (such as transients with rise times on the order of a nanosecond) are initially attenuated by conduction of bidirectional TVS diode 260 in series with diodes 258, and/or by conduction of the bidirectional clamping apparatus 134 through the reverse conduction of unidirectional TVS diode 252. If the positive voltage transient persists long enough (for example, more than a microsecond) to develop a trigger signal for the thyristor 254, the thyristor 254 switches ON to connect the bidirectional clamping apparatus 134 directly across the power bus 210, clamping both slower high-energy positive voltage transients as well as faster low-energy positive transients. Continuous abnormally high positive voltages of less magnitude than the positive voltage threshold (Vp) and continuous abnormally high negative voltages that are of less magnitude than the negative voltage threshold (Vn) are not attenuated by the protection device 230.

Figure 3:
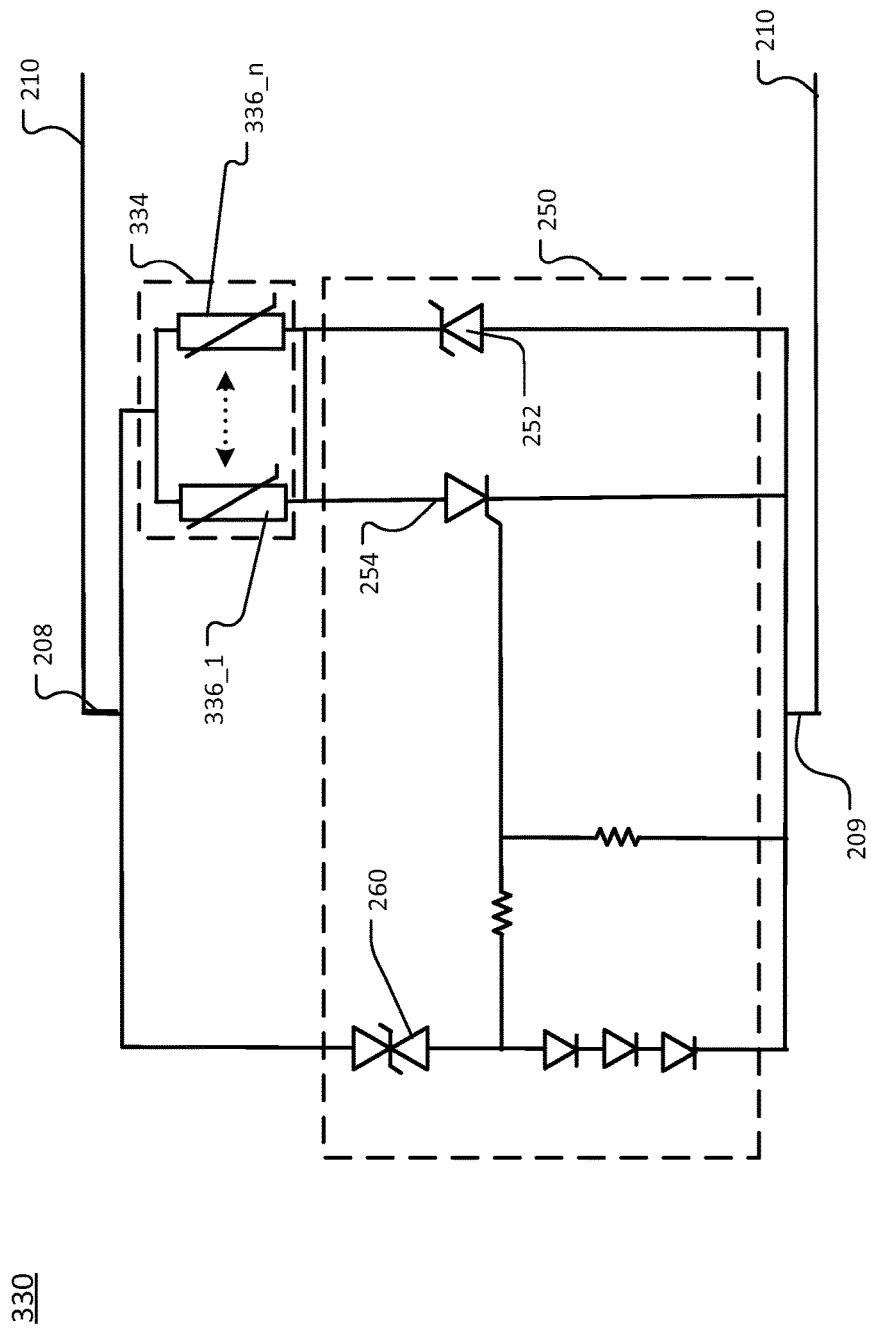

Referring to FIG. 3, a block diagram of an exemplary protection device 330 is shown. The protection device 330 is the same as the protection circuit 220 (FIG. 2), except the protection circuit includes a bidirectional clamping apparatus 334 in place of the bidirectional clamping apparatus 134.

The bidirectional clamping apparatus 334 includes a plurality of metal oxide varistors (MOVs) 336_1 to 336_n that are connected in parallel with each other. Any number of MOVs may be used in the bidirectional clamping apparatus 334. For example, one, two, three, four, eight, or any number of MOVs may be connected in parallel. Additionally, one or more of the MOVs 336_1 to 336_n may be a collection of MOVs connected in series and/or in parallel with each other.

The number, configuration, and electrical characteristics of MOVs included in the bidirectional clamping apparatus 334 depends on the desired Vcn and Vcp, and on the amount of energy in the voltage transients that the bidirectional clamping apparatus 334 is expected to clamp in a given application. Having a greater number of MOVs allows the shunted current that is dissipated by the MOV array during a voltage transient to be shared among the MOVs, resulting in each individual MOV having a longer life span.

Each of the MOVs 336_1 to 336_n is a bidirectional device through which current may flow when a voltage that is more positive than a positive voltage standoff Vsp 336 or is more negative than a negative voltage standoff Vsn 336 is across the MOV. The MOVs 336_1 to 336_n are also associated with a positive clamping voltage Vcp 336 and a negative clamping voltage Vcn 336, which are the voltages at which the maximum peak current needed to be conducted or shunted for the application flows through the MOV. The clamping voltage Vcp and Vcn of a MOV may be about 2 times greater than its standoff voltage.

Figure 4:
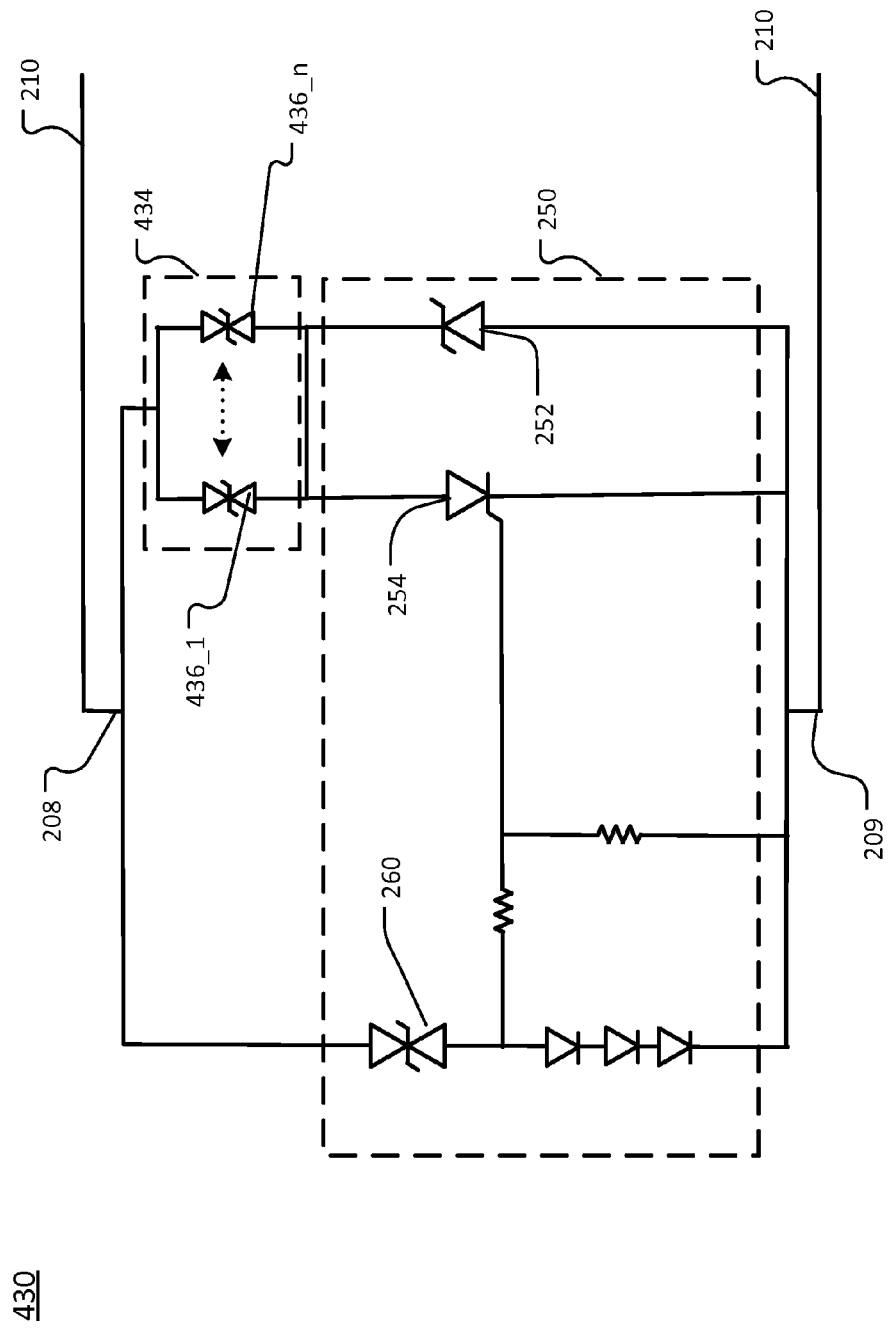

Referring to FIG. 4, a block diagram of an exemplary protection device 430 is shown. The protection device 430 is the same as the protection device 330 (FIG. 3), except the protection device 430 includes a bidirectional clamping apparatus 434 that includes a plurality of bidirectional TVS diodes 436_1 to 436_n in parallel with each other.

Any number of bidirectional TVS diodes may be used in the bidirectional clamping apparatus 434. For example, one, two, three, four, eight, or any number of bidirectional TVS diodes may be connected in parallel. The number and the characteristics of the bidirectional TVS diodes included in the bidirectional clamping apparatus 434 depends on the desired Vcn and Vcp, and on the amount of energy in the transient voltages that the bidirectional clamping apparatus 434 is expected to clamp in a given application.

Each of the bidirectional TVS diodes 436_1 to 436_n allows current to flow through the bidirectional TVS diode when a voltage that is more positive or more negative than a standoff voltage is across the bidirectional TVS diode. The bidirectional TVS diodes 436_1 to 436_n are also associated with a clamping voltage Vcp and Vcn, which is the voltage at which the maximum peak current expected for the application flows through the bidirectional TVS diodes. For a bidirectional TVS diode, the clamping voltage of a bidirectional TVS diode may be about 1.4 times greater than its standoff voltage. Thus, as compared to a MOV, a TVS diode clamps at a voltage that is closer to the standoff voltage. However, because there still is a significant difference between the standoff voltage Vsp and Vsn and the clamping voltage Vcp and Vcn, using the control element 250 with the bidirectional clamping apparatus 434 improves the performance of the bidirectional clamping apparatus 434 in certain applications. For example, such an arrangement can be used when it is desirable to conduct a substantial amount of current through the bidirectional clamping apparatus 434 at a voltage that is just above a continuous abnormally high voltage at which the apparatus 434 would potentially be damaged if allowed to conduct a substantial amount of current for a prolonged period of time.

Figure 5:
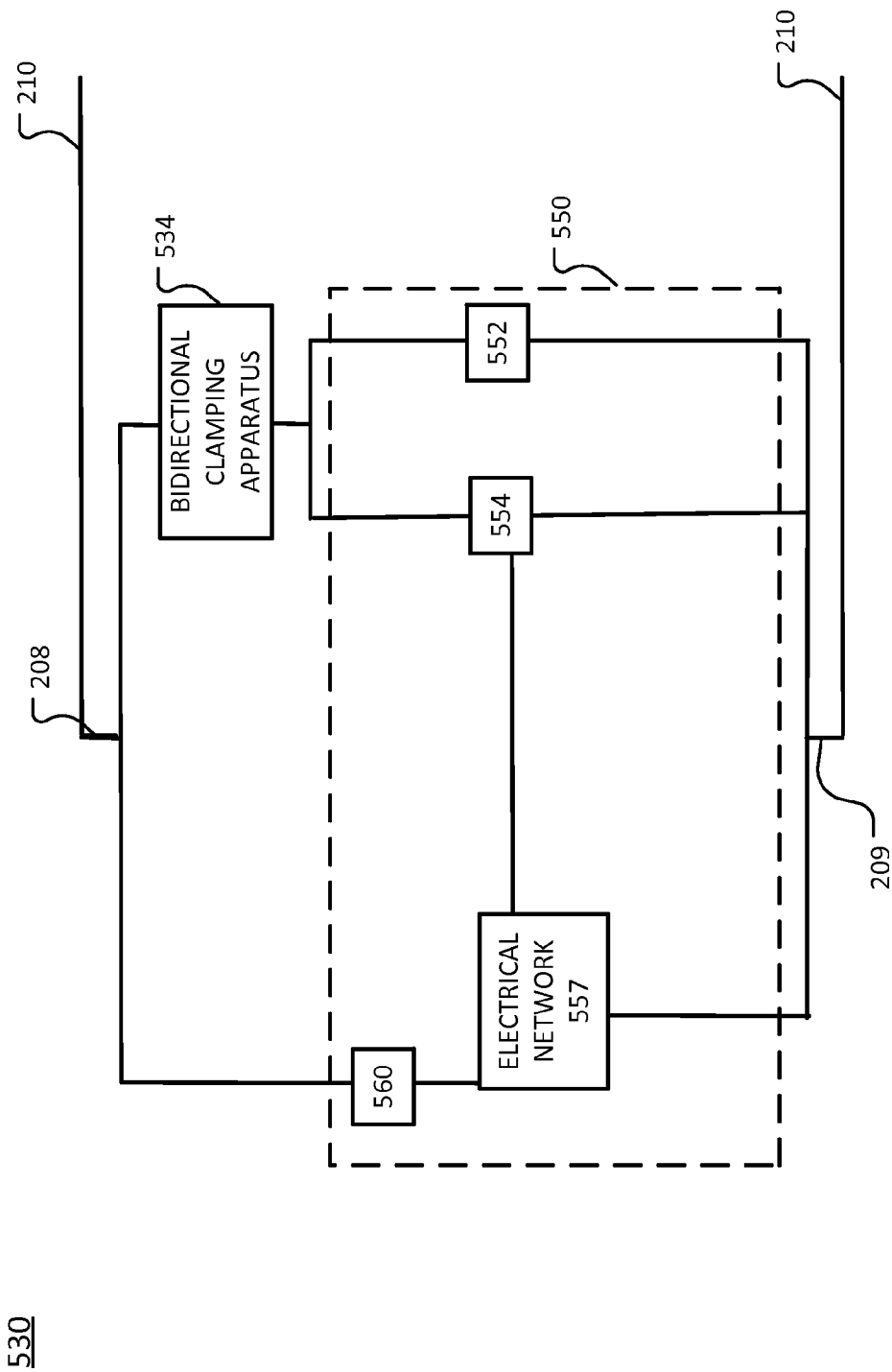

Referring to FIG. 5, another exemplary protection device 530 is shown. The protection device 530 is configured to be connected to a power bus of a power system to protect a load that is also connected to the power bus. In the example of FIG. 5, the protection device 530 is connected to the power bus 210 (FIG. 2).

The protection device 530 includes a bidirectional clamping apparatus 534 and a control element 550. The control element 550 includes a first control element 552, a second control element 554 in parallel with the first control element 552, an electronic component 560, and an electrical network 557 between the electronic component 560 and the second control element 554.

The protection device 530 is connected between the high line 208 and the low line 209. When the voltage across the power bus 210 becomes more positive than a positive voltage threshold Vp or more negative than a negative voltage threshold Vn, the protection device 530 forms a current path across the bus 210. When the current path is formed, the bidirectional clamping apparatus 534 conducts current (possibly tens or hundreds of amperes) and the voltage on the bus 210 is clamped at or below a positive clamping voltage or a negative clamping voltage that is within the no-damage rating of the loads connected to the power bus 210. Thus, the protection device 530 protects the loads connected to the bus 210 by maintaining the voltage across the bus 210 (and across the loads) to voltages that are within the no-damage rating of the connected loads.

When the voltage across the power bus 210 becomes more positive than the positive voltage threshold Vp, the current path is formed through the bidirectional clamping apparatus 534 and the second control element 554. When the voltage across the power bus 210 becomes more negative than the negative voltage threshold Vn, the current path is formed through the bidirectional clamping apparatus 534 and the first control element 552.

The bidirectional clamping apparatus 534 may be similar to the bidirectional clamping apparatuses 134, 334, or 444 discussed above. The first control element 552 may be any type of unidirectional device, such as a diode or a Zener diode or a unidirectional TVS diode, which is connected between the negative line 209 and the bidirectional clamping apparatus 534 in a manner that allows the first control element 552 to conduct current when the voltage across the bus 210 becomes negative. For example, the first control element 522 may be a diode with the cathode connected to the bidirectional clamping apparatus 534. In this configuration, the diode conducts current when the voltage across the bus 210 becomes more negative than the sum of the forward voltage of the diode and the Vsn of the bidirectional clamping apparatus 534. The first control element 552 may include multiple electronic components. For example, the first control element 552 may include a plurality of diodes, Zener diodes, or unidirectional TVS diodes connected in series or parallel, or any combination of such elements connected in series between the negative line 209 and the bidirectional clamping apparatus 534.

The second control element 554 may be a current-controlled switch, such as a thyrisor, an SCR, or a triac that conducts current in an ON state and otherwise does not conduct current. The second control element 554 may be a three-terminal device. The second control element 554 conducts current and connects the bidirectional clamping apparatus 534 directly across the bus 210 when the control element 554 is ON.

The electronic component 560 is a non-linear device that conducts current and provides current to the electrical network 557 when the voltage across the bus 210 exceeds the positive voltage threshold Vp. The electronic component 260 may be, for example, a bidirectional TVS diode, a MOV, and/or a combination of unidirectional diodes connected to behave as a bidirectional device.

The electrical network 557 is any combination of electronic components or any electric component that is capable of delivering a current that is sufficient to trigger the second control element 554 to the ON state from the current provided by the electronic component 260. The electrical network 557 may include, for example, resistors, diodes, transistors, switches, or any combination of such components. The electrical network 557 may be an integrated circuit.

Other implementations are within the scope of the following claims. For example, the diodes 258 (FIG. 2) are shown as three diodes connected in series. However, the diodes 258 may be a series string of any number of diodes. More than one of the protection devices 130, 230, 330, 430 may be used in a particular power system. The protection devices 130, 230, 330, 440, and 540 may be encapsulated in an insulating material.

The power system 100 (FIG. 1A) may be part of any kind of machine that includes a power source (or that may be connected to a power source) that supplies electrical power through a power bus to electronic components that may be damaged by unexpected changes in the voltage across the power bus. The power system 100 may be a portion of a power bus of any type of vehicle, including, for example, a personal automobile, a military vehicle, a truck, or a piece of heavy equipment, such as a back hoe. The loads 170 that are connected to the power bus 110 and selected for protection may include, for example, navigation and entertainment systems, lighting systems, and safety equipment (such as air bags and anti-lock brakes). Similarly, the power bus 210 (FIGS. 2-5) may be a power bus that delivers electrical power to loads in any kind of electrical machine, any type of vehicle, or a piece of industrial equipment.

In some implementations, and as shown in FIG. 1A, a mechanism for disconnection 131, such as a fuse, breaker, or any other component that is capable of breaking a current path, may be between the bus 110 and the protection device 130. The mechanism for disconnection 131 electrically disconnects the protection device 130 from the bus 110 in the event that the bidirectional clamping apparatus 134 and/or another component in the protection device 130 fails shorted.

The power bus 110 and the power bus 210 can be DC power buses that have a relatively low nominal voltage, for example, 12-48V.

What is claimed is:

1. A protection device for connection to a power bus of a direct current (DC) electrical power system, the protection device comprising:
    a bidirectional clamping apparatus configured to conduct current when a voltage across the bidirectional clamping apparatus is more positive than a positive voltage standoff and when the voltage across the bidirectional clamping apparatus is more negative than a negative voltage standoff;
    a switch in series with the bidirectional clamping apparatus, the switch configured to receive a trigger signal from an electrical network and to change states based on receiving the trigger signal; and
    a first control element configured to conduct current in two directions, the first control element in series with the bidirectional clamping apparatus and in parallel with the switch, the first control element not configured to receive a trigger signal from the electrical network such that the first control element in series with the bidirectional clamping apparatus is able to provide a current path across the power bus when the switch is in any state, wherein
        both of (i) the switch and (ii) the first control element with the bidirectional clamping apparatus are configured to provide a current path across the power bus when a magnitude of a voltage on the power bus exceeds a positive voltage threshold, the positive voltage threshold being greater than the positive voltage standoff of the protection device, and
        the first control element with the bidirectional clamping apparatus is configured to provide a current path across the power bus when a magnitude of a voltage on the power bus exceeds a negative voltage threshold, the negative voltage threshold being more negative than the negative voltage standoff of the bidirectional clamping apparatus.

2. The protection device of claim 1, wherein the bidirectional clamping apparatus comprises a metal oxide varistor (MOV).

3. The protection device of claim 1, wherein the bidirectional clamping apparatus comprises a plurality of MOVs connected in parallel, series, or series-parallel with each other.

4. The protection device of claim 1, wherein the bidirectional clamping apparatus comprises a bidirectional transient-voltage-suppression (TVS) diode.

5. The protection device of claim 1, wherein the bidirectional clamping apparatus comprises a plurality of bidirectional TVS diodes connected in parallel, series, or series-parallel with each other.

6. The protection device of claim 1, wherein the bidirectional clamping apparatus comprises one or more MOVs and one or more bidirectional TVS diodes.

7. The protection device of claim 1, wherein the bidirectional clamping apparatus comprises two or more unidirectional diodes configured as a bidirectional diode, each unidirectional diode having a forward voltage at which the diode conducts current in a first direction and a reverse breakdown voltage at which the diode conducts current in a different direction.

8. The protection device of claim 7, wherein the positive voltage standoff of the bidirectional clamping apparatus is the reverse breakdown voltage of one of the unidirectional diodes and the negative voltage standoff of the bidirectional clamping apparatus is the reverse breakdown voltage of another one of the unidirectional diodes.

9. The protection device of claim 8, wherein the reverse breakdown voltage of at least one of the two or more unidirectional diodes is different than the reverse breakdown voltage of at least one of the other unidirectional diodes.

10. The protection device of claim 1, wherein the switch has only two states, an ON state and an OFF state, and current flows through the switch only when the switch is in the ON state.

11. The protection device of claim 10, wherein the switch comprises a current-controlled switch, and the protection device further comprises the electrical network, and the electrical network is configured to generate the trigger signal, the trigger signal comprising a trigger current sufficient to trigger the current-controlled switch to the ON state.

12. The protection device of claim 11, further comprising an electrical component between the electrical network and the power bus, wherein
    the electrical component provides an electrical current when the voltage across the power bus exceeds the positive voltage threshold of the protection device, and
    the electrical network generates the trigger current based on the electrical current provided by the electrical component.

13. The protection device of claim 11, wherein the first control element comprises a unidirectional TVS diode, and the current-controlled switch comprises a thyristor.

14. The protection device of claim 12, wherein the electrical component comprises a bidirectional TVS diode.

15. The protection device of claim 1, further comprising a bidirectional TVS diode in series with at least one diode, and wherein
    the first control element comprises a unidirectional TVS diode,
    the switch comprises a current-controlled switch, and
    the bidirectional TVS diode is between a gate of the current-controlled switch and the power bus.

16. The protection device of claim 15, wherein
    the current-controlled switch is associated with an activation delay, and the current-controlled switch and the bidirectional clamping apparatus provide the current path across the power bus for voltages having a magnitude that exceed the positive voltage threshold only after the activation delay, and
    during the activation delay, either or both of: (a) the bidirectional TVS diode connected between the gate of the current-controlled switch and the power bus and (b)

the unidirectional TVS diode and the bidirectional clamping apparatus provide the current path across the power bus.

17. The protection device of claim 1, further comprising an electronic component that is separate from the bidirectional clamping apparatus, the electronic component providing a second current path across the power bus at least some of the time when the voltage on the power bus exceeds the positive voltage threshold.

18. The protection device of claim 1, wherein the magnitude of the positive voltage standoff of the bidirectional clamping apparatus and the magnitude of the negative voltage standoff of the bidirectional clamping apparatus are substantially the same.

19. The protection device of claim 1, wherein
the protection device is configured to withstand without damage the application of continuous voltages between a maximum negative voltage and a maximum positive voltage,
the negative voltage standoff of the bidirectional clamping apparatus is equal to or more negative than the maximum negative voltage, and
the positive voltage standoff of the protection device is equal to or more positive than the maximum positive voltage.

20. The protection device of claim 1, wherein
the first control element is associated with a forward diode drop voltage and a reverse clamping voltage,
such that the positive voltage threshold of the protection device is greater than a positive voltage standoff of the parallel combination of the switch and the first control element added to the positive voltage standoff of the bidirectional clamping apparatus,
the negative voltage threshold is more negative than the negative voltage standoff of the bidirectional clamping apparatus added to the forward diode drop voltage of the first control element,
during an activation delay associated with the switch, the first control element and the bidirectional clamping apparatus provide the current path across the power bus for voltages having a magnitude that exceed the positive voltage threshold, and
the only current path that the protection device provides for any negative transient voltages on the power bus that have a magnitude that exceeds the negative voltage threshold is through the first control element and the bidirectional clamping apparatus, and the magnitude of a negative voltage transient on the power bus exceeding the negative voltage threshold alone is sufficient to provide the current path through the first control element and the bidirectional clamping apparatus.

21. A method of protecting a direct current (DC) power system, the method comprising:
connecting a protection device across a DC power bus, the protection device comprising: a bidirectional clamping apparatus, a switch in series with the bidirectional clamping apparatus, and a first control element also in series with the bidirectional clamping apparatus and in parallel with the switch;
conducting current from the DC power bus through the first control element in series with the bidirectional clamping apparatus to clamp the voltage on the DC power bus when the voltage on the DC power bus is more positive than a second positive voltage threshold, the second positive voltage threshold being greater than a positive voltage standoff of the protection device; and
conducting current from the DC power bus through the first control element in series with the bidirectional clamping apparatus to clamp the voltage on the power bus when the voltage on the DC power bus is more negative than a negative voltage threshold, the negative voltage threshold being more negative than a negative voltage standoff of the bidirectional clamping apparatus, wherein
the switch is configured to change state based on a trigger signal received from an electrical network, and the first control element is not configured to receive a trigger signal from the electrical network.

22. The method of claim 21, further comprising conducting current from the power bus through a current path formed with an electronic component that is separate from the bidirectional clamping apparatus, to clamp the voltage on the power bus at least some of the time when the voltage on the power bus is greater than a positive voltage threshold.

23. The method of claim 22, wherein current is conducted with the electronic component that is separate from the bidirectional clamping apparatus prior to conducting the current from the power bus through the bidirectional clamping apparatus and the switch.

24. A protection device for connection to a power bus of a power system, the protection device comprising:
a bidirectional clamping apparatus;
a switch electrically coupled to an electrical network and in series with the bidirectional clamping apparatus, the switch configured to receive a trigger signal from the electrical network and to change state in response to receiving the trigger signal; and
a first control element configured to conduct current in two directions, the first control element being in series with the bidirectional clamping apparatus and in parallel with the switch, the first control element not configured to receive a trigger signal from the electrical network and not connected to the electrical network,
wherein each of the first control element and the switch comprises an anode and a cathode,
the bidirectional clamping apparatus is connected to the cathode of the first control element and to the anode of the switch,
both of (i) the switch and (ii) the first the control element with the bidirectional clamping apparatus are configured to provide a current path across the power bus when a magnitude of a voltage on the power bus exceeds a positive voltage threshold, the positive voltage threshold being greater than the positive voltage standoff of the protection device, and
the first control element with the bidirectional clamping apparatus is configured to provide a current path across the power bus when a magnitude of a voltage on the power bus exceeds a negative voltage threshold, the negative voltage threshold being more negative than the negative voltage standoff of the bidirectional clamping apparatus.

25. The protection device of claim 24, wherein:
the bidirectional clamping apparatus comprises at least one MOV, at least one bidirectional TVS diode, or at least one MOV and at least one bidirectional TVS diode;
the first control element comprises a bidirectional diode device configured to conduct current in two directions, and
the switch comprises a current-controlled switch.

26. The protection device of claim 25, wherein
the first control element comprises a unidirectional TVS diode, and
the switch comprises a thyristor.

27. The protection device of claim 25, wherein the current-controlled switch comprises a gate, and the protection device further comprises the electrical network, the electrical network being connected to the gate of the current-controlled switch.

28. The protection device of claim 27, further comprising a bidirectional TVS diode connected to the electrical network.

* * * * *